United States Patent
Kawashima

(10) Patent No.: US 9,497,350 B2
(45) Date of Patent: Nov. 15, 2016

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventor: Yasuaki Kawashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/678,807

(22) Filed: Apr. 3, 2015

(65) Prior Publication Data

US 2015/0296097 A1  Oct. 15, 2015

(30) Foreign Application Priority Data

Apr. 11, 2014 (JP) ................................. 2014-082018

(51) Int. Cl.
*H04N 1/04* (2006.01)
*H04N 1/32* (2006.01)

(52) U.S. Cl.
CPC ............ *H04N 1/32496* (2013.01); *H04N 1/04* (2013.01)

(58) Field of Classification Search
CPC ............................ H04N 1/32496; H04N 1/04
USPC ........................................ 358/1.15, 484, 474
See application file for complete search history.

(56) References Cited

U.S. PATENT DOCUMENTS

2011/0122435 A1* 5/2011 Nishiyama ......... H04N 1/00222
                                                                   358/1.15

FOREIGN PATENT DOCUMENTS

JP          8-223339 A     8/1996
JP        2012-142680 A    7/2012

* cited by examiner

*Primary Examiner* — Houshang Safaipour
(74) *Attorney, Agent, or Firm* — Canon U.S.A., Inc. IP Division

(57) ABSTRACT

An image processing apparatus performs automatic transmission if a timeout occurs during execution of continuous reading processing and a function for confirmation by a user is not set for the job. The image processing apparatus does not perform the automatic transmission if a timeout occurs during the execution of the continuous reading processing and the function for confirmation by the user is set for the job.

9 Claims, 15 Drawing Sheets

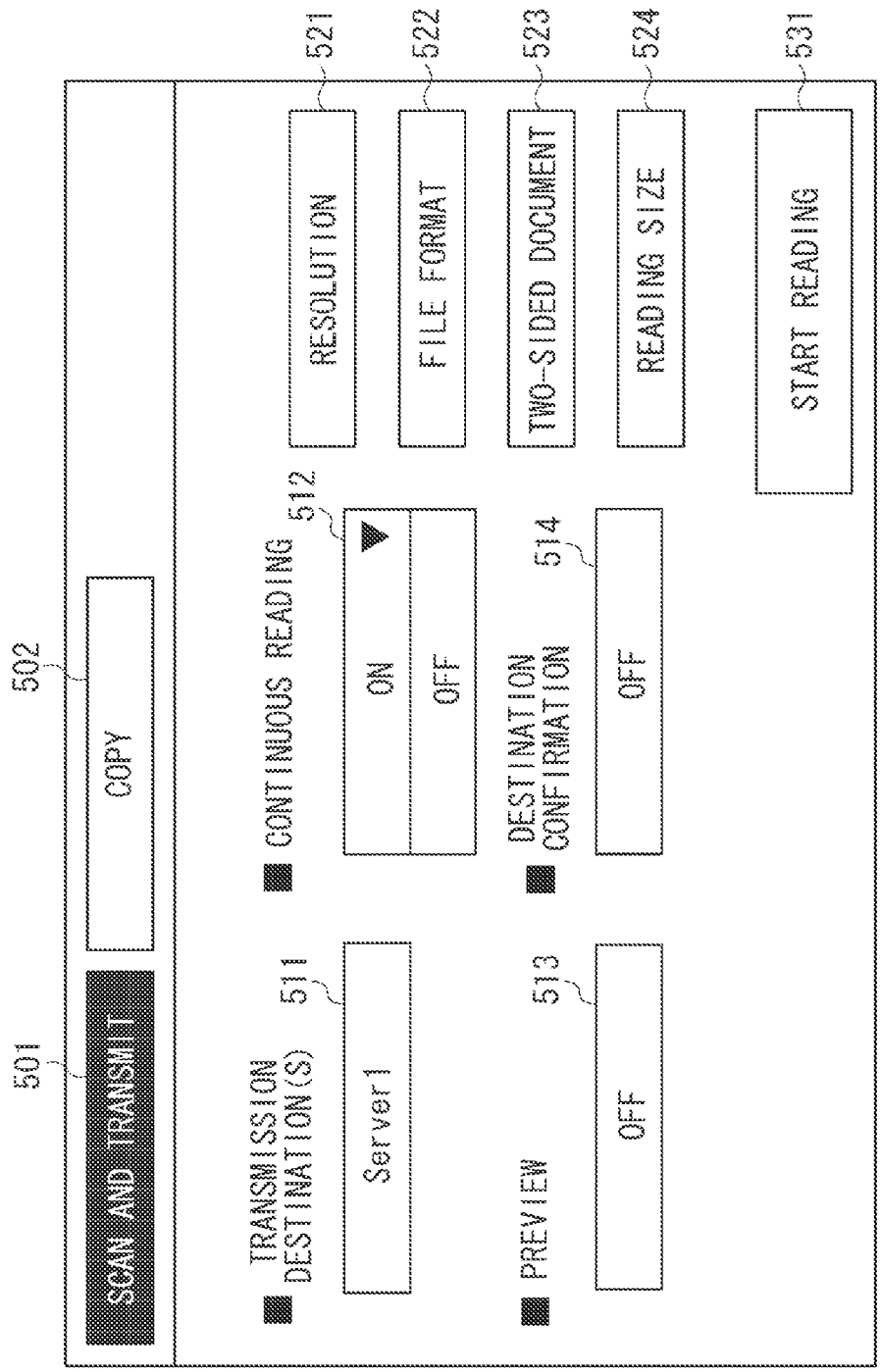

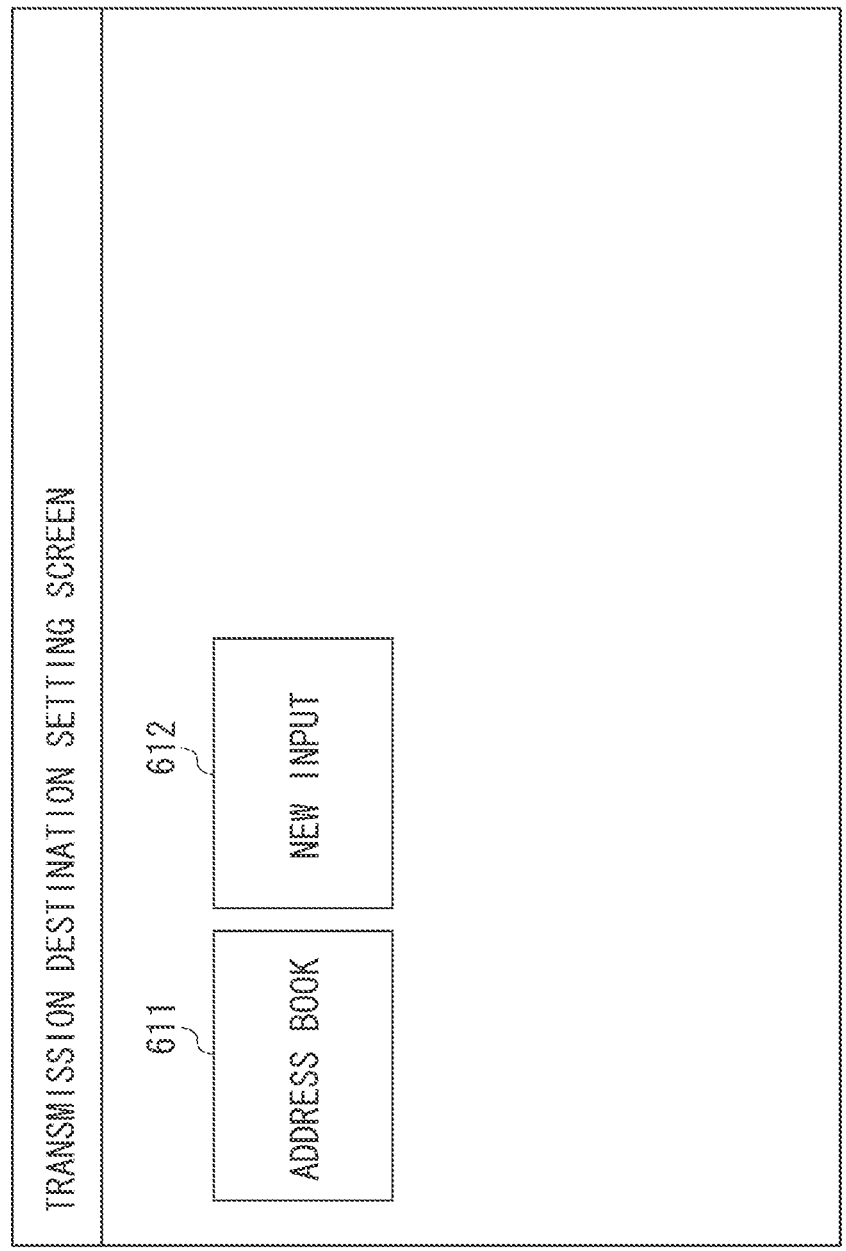

FIG. 6B

SELECT FROM ADDRESS BOOK

| TYPE | NAME | DESTINATION |
|---|---|---|
| FAX | Tanaka | 03-xxxx-xxxx |
| FTP | Ito | Server1.xxx.com |
| WebDAV | Kato | Server2.xxx.com |
| E-MAIL | Kimura | kimura@xxx.com |
| FTP | Ikeda | Server3.xxx.com |
| E-MAIL | Maeda | maeda@xxx.com |

REGISTER    DISPLAY DETAILS    OK

FIG. 13

| DESTINATION CONFIRMATION | | | |
|---|---|---|---|
| IMAGE DATA WILL BE TRANSMITTED TO FOLLOWING 3 DESTINATIONS. START TRANSMISSION? ~1311 | | | |
| TYPE | NAME | DESTINATION | 1312 |
| FAX | Tanaka | 03-xxxx-xxxx | |
| FTP | Ito | Server1.xxx.com | |
| E-MAIL | Kimura | kimura@xxx.com | |

1301 — CANCEL

1302 — START TRANSMISSION

IMAGE PROCESSING APPARATUS, METHOD FOR CONTROLLING IMAGE PROCESSING APPARATUS, AND STORAGE MEDIUM

BACKGROUND

Field

Aspects of the present invention generally relate to an image processing apparatus for reading an object such as a document to generate image data and processing the image data, a method for controlling the image processing apparatus, and a storage medium.

Description of the Related Art

An image processing apparatus configured to read a document placed on a document positioning plate (document placing platen) according to a user's instruction has been conventionally known. An image processing apparatus that can inquire of the user whether to read the next document each time reading a document set on a document positioning plate has also been known (Japanese Patent Application Laid-Open No. 2012-142680). According to Japanese Patent Application Laid-Open No. 2012-142680, if the user gives an instruction to read the next document as a result of the inquiry, the image processing apparatus reads the next document. If the user gives an instruction to transmit image data that have been already read, the image processing apparatus performs processing for transmitting the image data that have been read so far.

In such a manner, according to Japanese Patent Application Laid-Open No. 2012-142680, a series of operations for replacing the document set on the document positioning plate and reading the next document can be repeated to obtain image data of a plurality of pages by reading documents placed on the document positioning plate. The obtained image data can be transmitted by a single transmission process. This can reduce the labor of having to set the destination of image data again if the user wants to read a plurality of documents on the document positioning plate.

An image processing apparatus that can continuously read documents fed from a document feeding unit (hereinafter, referred to as an auto document feeder (ADF)) has been conventionally known. An image processing apparatus that can inquire of a user whether to read the next document stack after reading an entire document stack set on an ADF has also been known.

Some users may execute a job without knowing that an inquiry screen "whether to read the next document" will be displayed when reading a document. Some users may have forgotten about the display. In such cases, a user who has pressed a start button to start reading a document can mistakenly think that all the operations are completed, and leave from the image processing apparatus. As a result, the job under execution is left with the screen "whether to read the next document" displayed, and thus the transmission of image data intended by the user is not performed.

Further, when another user attempts to use the image processing apparatus, the inquiry screen "whether to read the next document" is left displayed. In such a case, the user who wants to use the image processing apparatus to execute a new job needs to issue some instruction to terminate the job left by the previous user. For example, the user who wants to use the image processing apparatus needs to cancel the reading of the image data or wait until the previous user notices the user's mistake and performs a required operation. Such an image processing apparatus is hard to use.

To address such an issue, Japanese Patent Application Laid-Open No. 8-223339 discusses starting transmission of read image data (transmission due to a timeout) if a user is inquired of whether to read the next document and the user's instructions are not input within a predetermined time.

According to Japanese Patent Application Laid-Open No. 8-223339, the read image data is transmitted if the user is inquired of whether to read the next document and a predetermined time has elapsed.

An image processing apparatus including a confirmation function used for confirmation by a user has conventionally been known. Among known confirmation functions used for confirmation by the user are a preview function for displaying on a display unit image data generated by reading a document and a destination confirmation function for confirming a transmission destination of image data.

If the image processing apparatus including the confirmation function inquires of the user whether to read the next document and performs transmission due to a timeout, e.g., t performs transmission due to a timeout on the screen "whether to read the next document", the image data is transmitted without being confirmed by the user even though the confirmation function is set for the job.

Consequently, even if the user intends to cancel the transmission according to the result of confirmation by the confirmation function, the image data is transmitted against the intention of the user.

SUMMARY

Aspects of the present invention are generally directed to an image processing apparatus capable of, if a predetermined time has elapsed without an instruction whether to read the next document being accepted, preventing transmission from being performed even though the confirmation function is set.

According to an aspect of the present invention, an image processing apparatus capable of reading a document to generate image data and executing a job for performing specified processing on the image data includes an acceptance unit configured to accept a read instruction to read a next document and a control unit configured to, in a case where a predetermined time has elapsed without the read instruction being accepted during execution of the job and a predetermined function for confirmation is not set for the job, control performance of the specified processing on the read image data.

Further features of the present disclosure will become apparent from the following description of exemplary embodiments with reference to the attached drawings.

BRIEF DESCRIPTION OF THE DRAWINGS

FIG. 5 is a diagram illustrating an operation screen of the MFP according to the exemplary embodiment.

FIGS. 6A and 6B are diagrams each illustrating an operation screen of the MFP according to the exemplary embodiment.

FIG. 13 is a diagram illustrating an operation screen of the MFP according to the exemplary embodiment.

DESCRIPTION OF THE EMBODIMENTS

Further features of the present disclosure will become apparent from the following description of exemplary embodiments with reference to the attached drawings.

Figure 1:
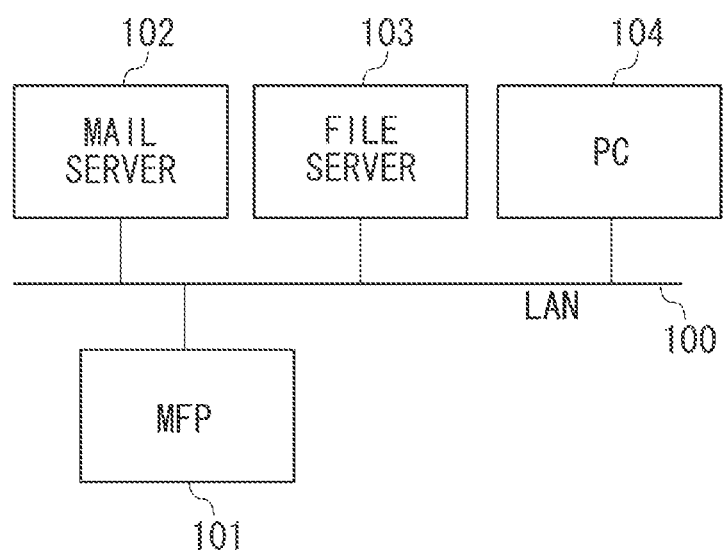
FIG. 1 is an overall diagram illustrating an image processing system according to an exemplary embodiment.

A first exemplary embodiment will be described. FIG. 1 is an overall diagram illustrating an image processing system. A multifunction peripheral (MFP) 101, a mail server 102, a file server 103, and a personal computer (PC) 104 are mutually communicably connected on a local area network (LAN) 100. The MFP 101 is an example of an image processing apparatus. In the present exemplary embodiment, the MFP 101 is described as an example of the image processing apparatus, whereas apparatuses other than an MFP, such as a single-function scanner apparatus, may be used as long as the apparatuses have a function of reading a document.

The MFP 101 can transmit image data by an electronic mail via the mail server 102. The MFP 101 can also transmit a file of image data to a folder in the file server 103 by using a transmission protocol such as the Server Message Block (SMB), the File Transfer Protocol (FTP), and the Distributed Authoring and Versioning protocol for the WWW (WebDAV). The MFP 101 is further connected to the public switched telephone networks (PSTN), which is not illustrated, and can perform facsimile transmission and reception via the PSTN.

Destinations (transmission destinations) for each transmission protocol can be registered in an address book to be described below. This can save a user from having to manually input a destination for each transmission. For example, the user may operate an operation unit of the MFP 101 to register transmission destinations in the address book. The user may use a web browser of the PC 104 to remotely control the MFP 101 to register transmission destinations in the address book.

While the image processing system is configured to include the MFP 101, the mail server 102, the file server 103, and the PC 104, only the MFP 101 can be referred to as an image processing system.

Figure 2:
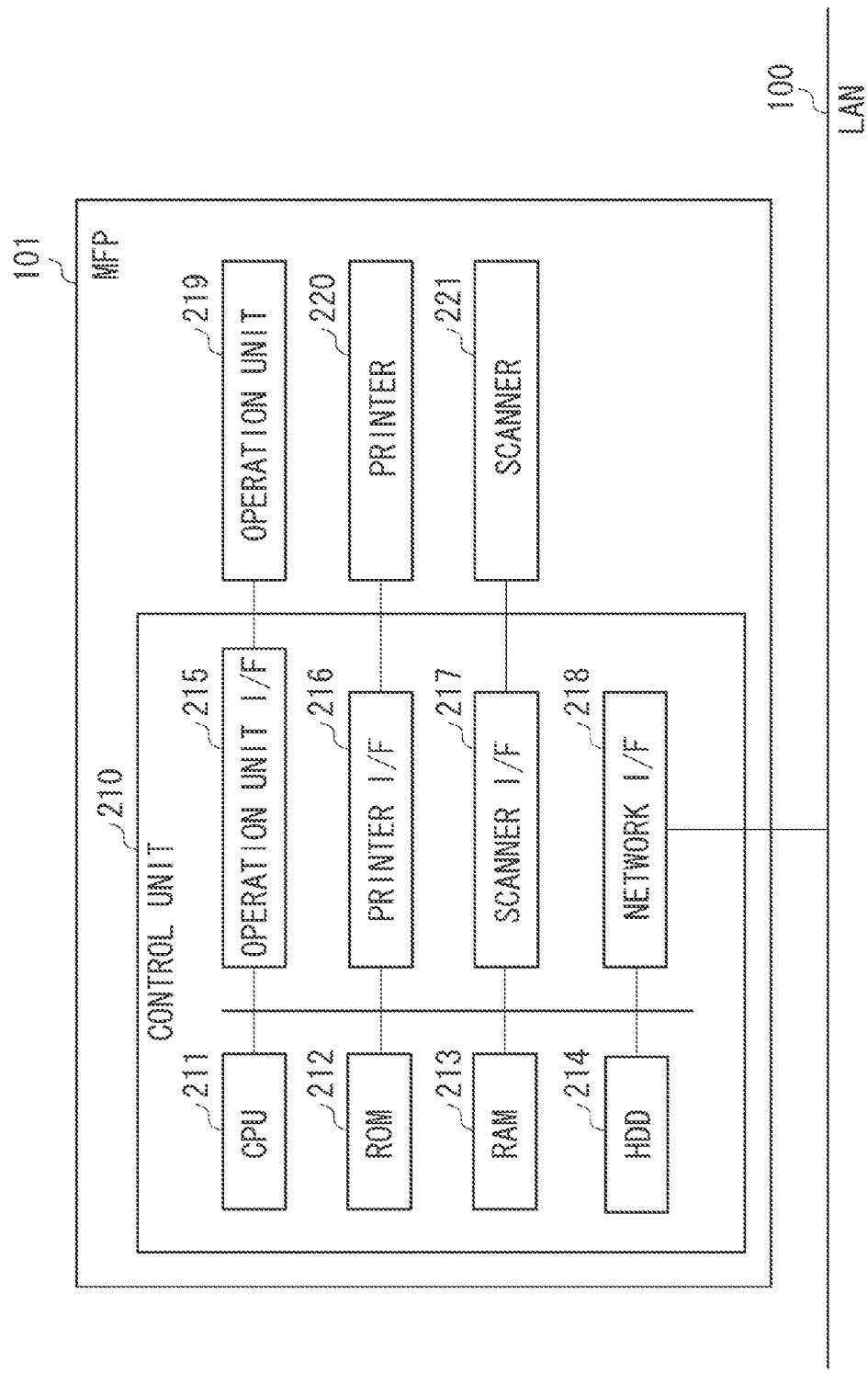
FIG. 2 is a block diagram illustrating a configuration of a multifunction peripheral (MFP) according to the exemplary embodiment.

FIG. 2 is a block diagram illustrating a hardware configuration of the MFP 101. A control unit 210 including a central processing unit (CPU) 211 controls an operation of the entire MFP 101. The CPU 211 reads a control program stored in a read-only memory (ROM) 212 and performs various controls such as read control and communication control. A random access memory (RAM) 213 is a main storage memory of the CPU 211. The RAM 213 is used as a work area and a temporary storage area for loading various programs stored in a hard disk drive (HDD) 214. The HDD 214 stores image data and various programs. An operation unit interface (I/F) 215 connects an operation unit 219 and the control unit 210. In the MFP 101, a single CPU 211 performs processing in flowcharts described below by using a single memory (RAM 213). However, the MFP 101 may be otherwise configured. For example, in the MFP 10, a plurality of CPUs and a plurality of RAMs, ROMs, and HDDs may cooperate and execute the processing illustrated in the flowcharts described below.

The operation unit I/F 215 connects the operation unit 219 and the control unit 210. The operation unit 219 includes a liquid crystal display unit having a touch panel function, and a keyboard. The operation unit 219 functions as an acceptance unit that accepts the user's instructions.

A printer I/F 216 connects a printer 220 and the control unit 210. Image data to be printed by the printer 220 is transferred from the control unit 210 to the printer 220 via the printer I/F 216. The printer 220 prints the image data on a sheet such as a sheet of paper.

A scanner I/F 217 connects a scanner 221 and the control unit 210. The scanner 221 reads a document set on the MFP 101 to generate image data (image file), and transfers the image data to the HDD 214 of the control unit 210 via the scanner I/F 217.

Figure 3:
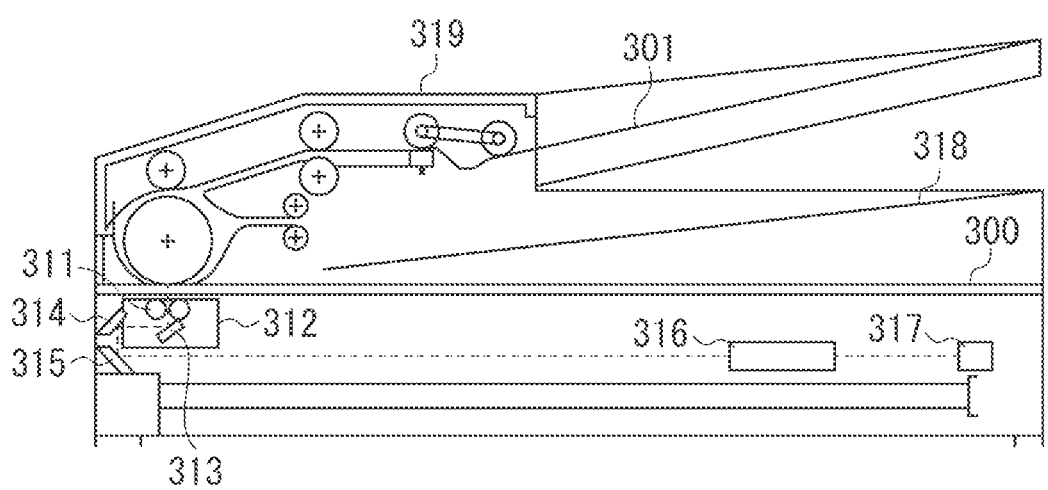
FIG. 3 is a cross-sectional view illustrating a configuration of a scanner according to the exemplary embodiment.

FIG. 3 is a cross-sectional view illustrating the scanner 221. A document feeding unit (hereinafter, referred to as ADF) 301 of the scanner 221 feeds documents from a document stack set thereon one by one, and conveys each document to an optical unit 312. The document conveyed to the optical unit 312 is read by the optical unit 312 and then discharged to a discharge tray 318.

When the document is conveyed to above the optical unit 312, the scanner 221 turns on a lamp 311 to irradiate the document with light. Here, reflected light from the document is guided to a charge-coupled device (CCD) image sensor (hereinafter, referred to as CCD) 317 via mirrors 313, 314, and 315, and a lens 316. The CCD 317 reads the reflected light from the document and outputs image data.

The scanner 221 can also read a document set on a document positioning plate 300 (between a document positioning plate cover 319 and the document positioning plate 300). In such a case, the canner 211 turns the lamp 311 on and scans the document by moving the optical unit 312. The reflected light from the document at that time is similarly guided to the CCD 317 via the mirrors 313, 314, and 315, and the lens 316. The CCD 317 reads the reflected light from the document to generate image data. If the reading of the document set on the document positioning plate 300 is completed, the optical unit 312 moves to a document reading start position in preparation for the reading of the next document.

Referring back to FIG. 2, the MFP 101 can transmit the image data generated by the scanner 221 by using various transmission protocols. The MFP 101 can also transfer the image data generated by the scanner 221 to the printer 220 to print the image data. The MFP 101 can further store the image data generated by the scanner 221 into a storage area that is readable and writable by the MFP 101.

A network I/F 218 connects the control unit 210 (MFP 101) to the LAN 100. The network I/F 218 transmits image data and information to external apparatuses (e.g., the mail server 102, the file server 103, and the PC 104) on the LAN 100, and receives information from the external apparatuses on the LAN 100. The MFP 101 further includes a modem (not illustrated) and can perform facsimile transmission and reception via the PSTN.

Figure 4:
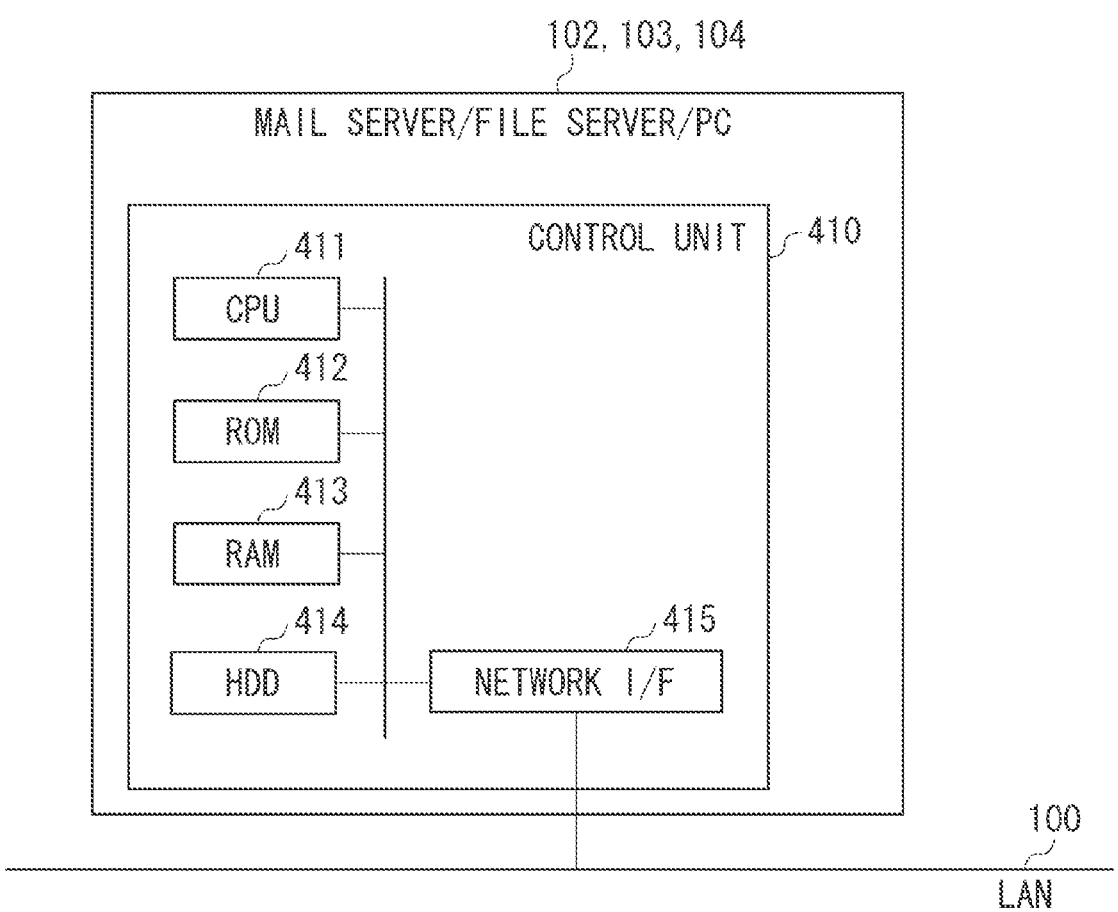
FIG. 4 is a block diagram illustrating a configuration of a mail server, a file server, and a personal computer (PC) according to the exemplary embodiment.

FIG. 4 is a block diagram illustrating a configuration of the mail server 102. A control unit 410 including a CPU 411 controls an operation of the entire mail server 102. The CPU 411 reads a control program stored in a ROM 412 or a HDD 414 and performs various controls. A RAM 413 is used as a main memory of the CPU 411 and a temporary storage area such as a work area. The HDD 414 is used as an auxiliary storage area for storing various programs and data.

A network I/F 415 connects the control unit 410 (mail server 102) to the LAN 100. The network I/F 415 transmits and receives various types of information to/from the other apparatuses on the LAN 100. The file server 103 has a similar configuration to that of the mail server 102. A description thereof will thus be omitted. The PC 104 includes a display unit (display) serving as a user interface and an operation unit for accepting user operations, in addition to the configuration of the mail server 102. Examples of the operation unit include a keyboard and a mouse. The mail server 102 and the file server 103 may include a display unit and an operation unit similar to those of the PC 104.

When the user starts using the MFP 101, a transmission job setting screen is displayed. FIG. 5 is a diagram illustrating an example of the transmission job setting screen displayed on the operation unit 219. On the transmission job setting screen of FIG. 5, the user can operate an operation key 501 or 502 to select a function (specify processing to execute). FIG. 5 illustrates a state where the operation key 501 is selected. While FIG. 5 illustrates "scan and transmit" and "copy" as examples of the functions, the MFP 101 may include other functions.

After selecting the operation key 501, the user can operate an operation key 511 to set the destination(s) of the image data to transmit. If the user operates the operation key 511, the MFP 101 displays an operation screen for setting the destination(s) on the operation unit 219. FIG. 6A illustrates an example of a transmission destination setting screen displayed on the operation unit 219 when the operation key 511 is selected. After selecting the operation key 511, the user can operate an operation key 611 or 612 to set the destination(s) of the image data to transmit. If the user operates the operation key 611, an address book screen for displaying the contents of the address book stored in the HDD 214 is displayed. The user can refer to the contents registered in the address book and set them as the destination(s) of the image data.

FIG. 6B illustrates the address book screen. Information 621 indicates the type of the destination. Information 622 indicates the name of the destination. Information 623 indicates a telephone number (facsimile number). If the type is an e-mail, the information 623 indicates a mail address. If the type is the SMB, FTP, or WebDAV, the information 623 indicates the hostname of the file server. The user can select one or a plurality of destinations from a plurality of destinations displayed on the address book screen. While the information 621, the information 622, and the information 623 are displayed on the address book screen in the present exemplary embodiment, other information may be displayed. An operation key 631 is an operation key for registering a new destination in the address book. An operation key 632 is an operation key for displaying details of the destinations registered in the address book. An operation key 633 is an operation key for determining the destination(s) selected by the user on the address book screen to be the destination(s) of the image data.

If the user operates the operation key 612, a screen for accepting input of a new destination from the user is displayed. The user can input a new destination via the displayed screen and set the new destination as the destination of the image data. If a destination(s) is/are set by the operation key 611 or 612, the screen transitions to the transmission job setting screen illustrated in FIG. 5.

Referring back to FIG. 5, an area 512 is an area for accepting a setting (continuous reading setting) about whether to, after reading a document, continuously read the next document or transmit the read document. In the present exemplary embodiment, options "ON" and "OFF" are displayed in the form of a drop-down list. If the continuous reading setting is set to be enabled (ON), the MFP 101, even in the case of continuously reading documents by using the ADF 301, can confirm with the user whether to read the next document after an entire document stack set on the ADF 301 is read.

An area 513 is an area for accepting a setting (preview setting) about whether to use a preview function. In the present exemplary embodiment, options "ON" and "OFF" are displayed in the form of a drop-down list. If the preview setting is set to be enabled (ON), the MFP 101 displays the generated image data on the operation unit 219 and waits for the user's instruction before transmitting the image data to the destination(s). On the other hand, if the preview setting is set to be disabled (OFF), the MFP 101 starts transmission without a preview.

An area 514 is an area for accepting a setting (destination confirmation setting) about whether to use a destination confirmation function. In the present exemplary embodiment, options "ON" and "OFF" are displayed in the form of a drop-down list. If the destination confirmation setting is set to be enabled (ON), the MFP 101 displays the destination(s) to which the image data is transmitted on the operation unit 219 and waits for the user's instruction before transmitting the image data to the destination(s). On the other hand, if the destination confirmation setting is set to be disabled (OFF), the MFP 101 starts transmission without confirming the destination(s).

In the present exemplary embodiment, the user makes the settings of the continuous reading function, the preview function, and the destination confirmation function on the transmission job setting screen. However, this is not restrictive. For example, the continuous reading function, the preview function, and the destination confirmation function can be set while reading a document using the scanner 221 to generate image data. The preview function and the destination confirmation function may be set on a continuation confirmation screen for inquiring of the user whether to read the next document during continuous reading processing (step S706).

In the present exemplary embodiment, which of the document positioning plate 300 and the ADF 301 is used to read a document, is determined based on a determination by a document detection sensor (not illustrated) that determines whether the document to be read is set on the document positioning plate 300 or the ADF 301. Which of the document positioning plate 300 and the ADF 301 is used to read a document may be determined according to a user instruction input from the operation unit 219.

An operation key 521 is an operation key to be used when setting reading resolution. An operation key 522 is an operation key to be used when setting the file format of the image file to transmit. An operation key 523 is an operation key to be used when making a setting about one-sided/two-sided reading. An operation key 524 is an operation key to be used when making a setting about color/monochrome etc. An operation key 531 is an operation key to be used when issuing an instruction to start reading the document and transmitting the image data.

Figure 7:
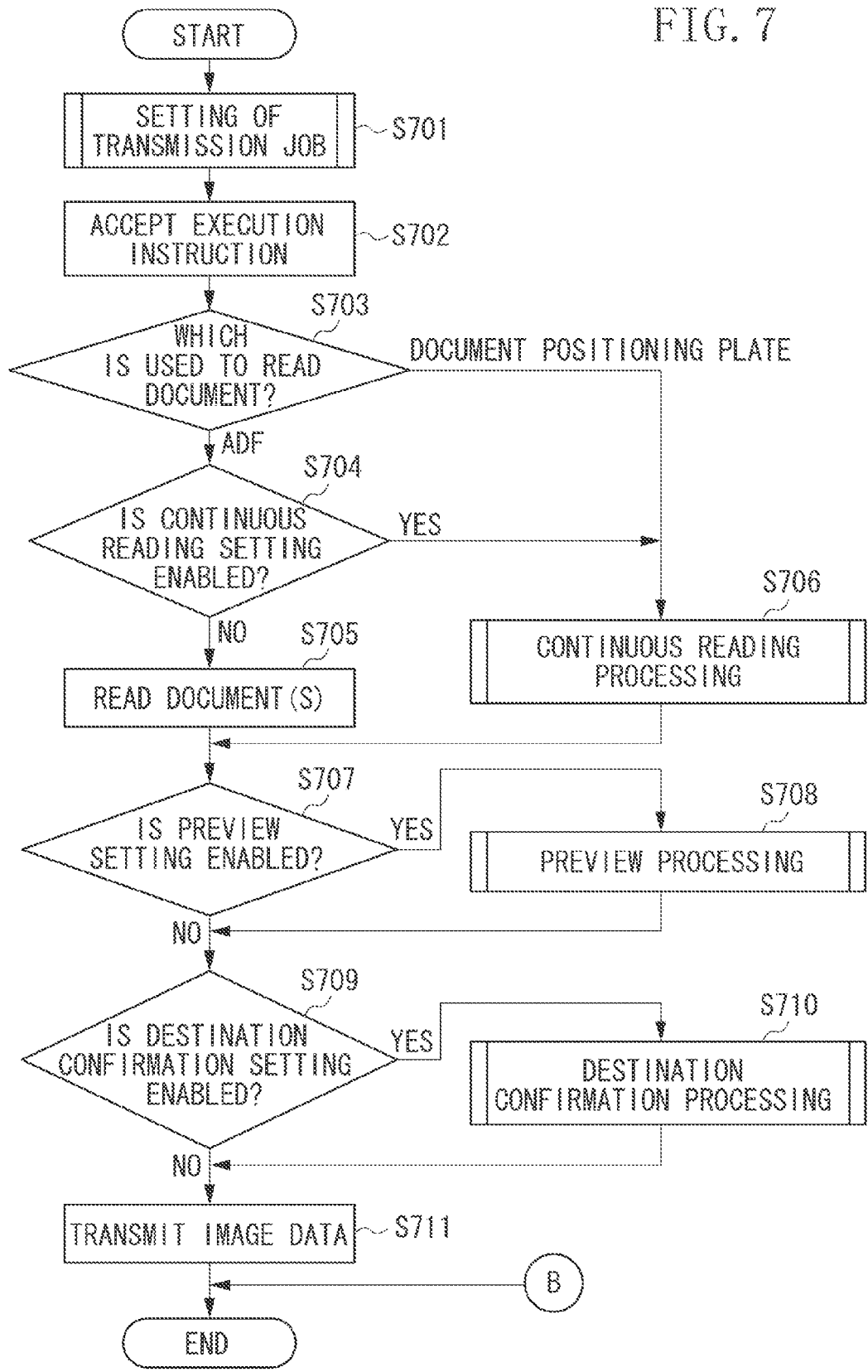
FIG. 7 is a flowchart illustrating transmission processing of the MFP according to the exemplary embodiment.
Figure 8:
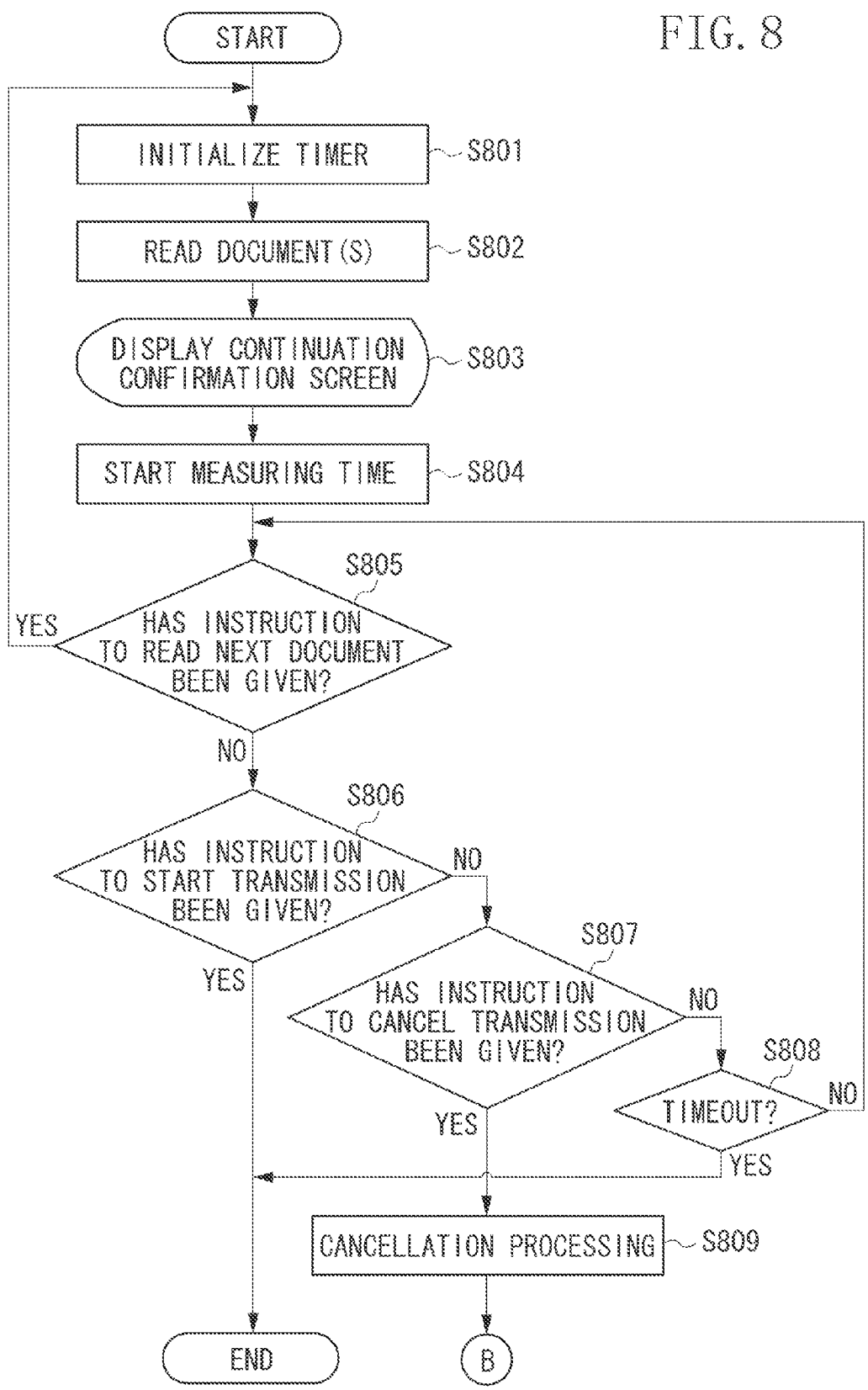
FIG. 8 is a flowchart illustrating transmission processing of the MFP according to the exemplary embodiment.
Figure 10:
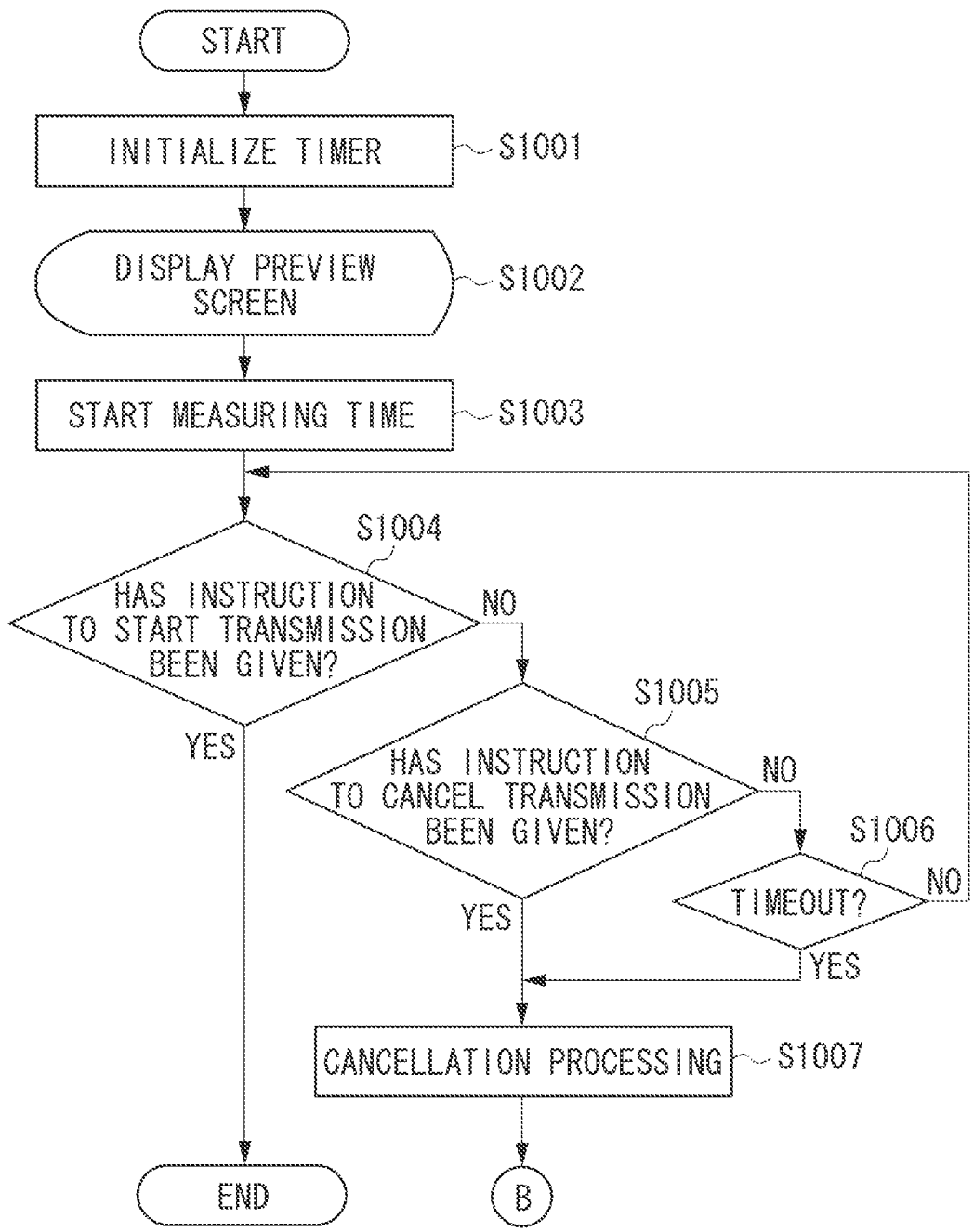
FIG. 10 is a flowchart illustrating transmission processing of the MFP according to the exemplary embodiment.
Figure 12:
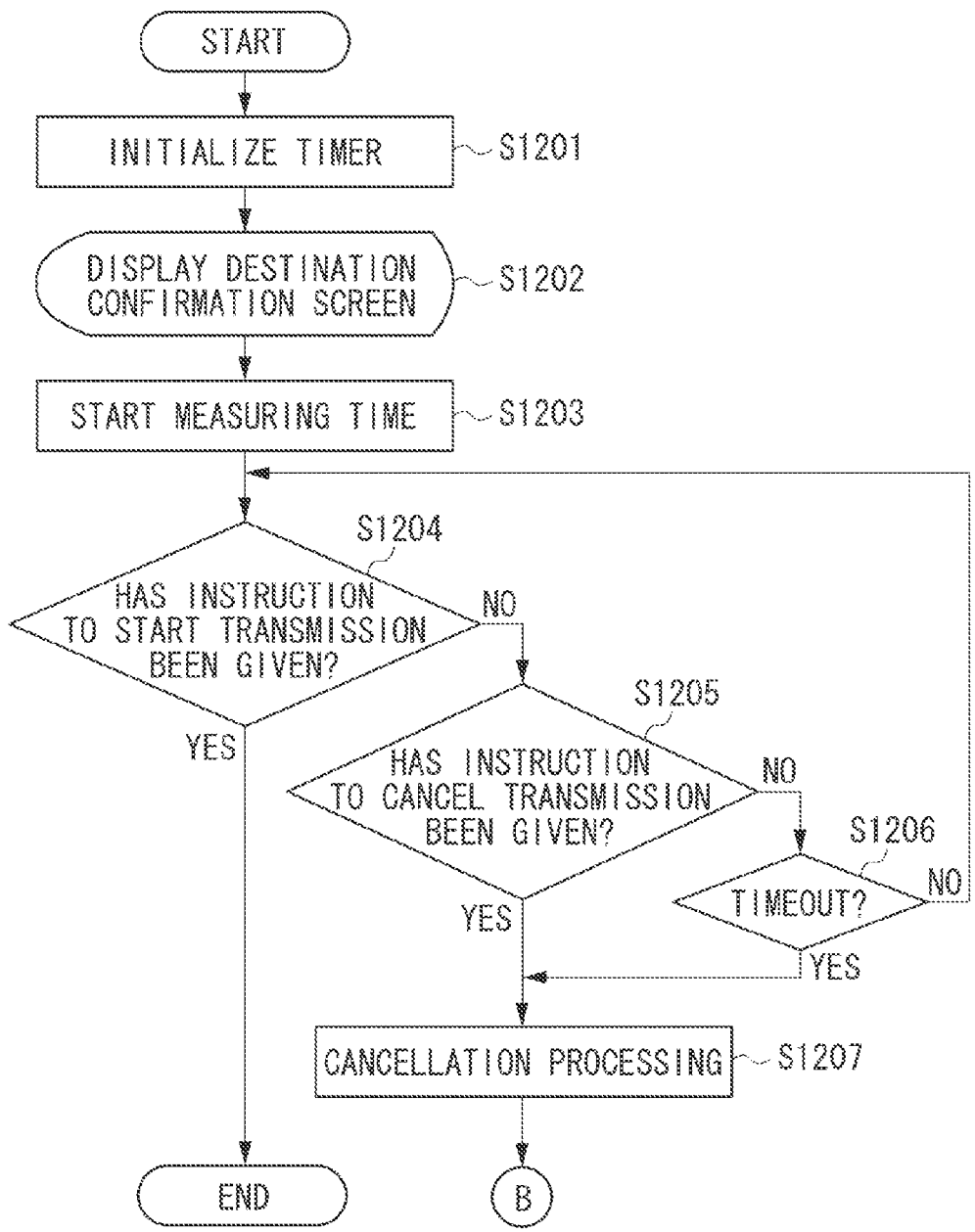
FIG. 12 is a flowchart illustrating transmission processing of the MFP according to the exemplary embodiment.

FIG. 7 is a flowchart illustrating a transmission control of image data by the MFP 101. Processes (steps) illustrated in the flowchart of FIG. 7 are implemented by the CPU 211 of the MFP 101 executing a control program stored in the HDD 214. The processes corresponding to steps S706, S708, and S710 will be described with reference to flowcharts illustrated in FIGS. 8, 10, and 12, respectively. The processes (steps) illustrated in the flowcharts of FIGS. 8, 10, and 12 are implemented by the CPU 211 of the MFP 101 executing the control program stored in the HDD 214.

When the user starts using the MFP 101, in step S701, the CPU 211 performs setting of a transmission job. The setting of the transmission job is performed via the screens of FIGS. 5, 6A, and 6B described above. In step S702, the CPU 211 accepts an execution instruction for the transmission job, which the user gives by pressing the operation key 531 or a start key provided as a hard key outside the screen. If the execution instruction for the transmission job is accepted, the CPU 211 starts executing the transmission job.

After starting executing the transmission job, in steps S703 and S704, the CPU 211 determines whether the reading of image data needs an inquiry to the user (read instruction) about whether to read the next document. More specifically, in step S703, the CPU 211 determines which of the document positioning plate 300 and the ADF 301 is used to read a document. If the CPU 211 determines that a document is read by using the ADF 301 (ADF in step S703), the processing proceeds to step S704. If the CPU 211 determines that a document is read by using the document positioning plate 300 (DOCUMENT POSITIONING PLATE in step S703), the processing proceeds to step S706.

In step S704, the CPU 211 determines whether the continuous reading setting is enabled. If the continuous reading setting is enabled (YES in step S704), the processing proceeds to step S706. If the continuous reading setting is disabled (NO in step S704), the processing proceeds to step S705. In the present exemplary embodiment, if a document is read using the document positioning plate 300, the CPU 211 inquires of the user whether to read the next document regardless of whether the continuous reading setting is enabled. However, this is not restrictive. For example, the CPU 211 may not inquire of the user whether to read the next document, if a document is read using the document positioning plate 300 and the continuous reading setting is disabled. In such a case, the CPU 211 may determine whether the continuous reading setting is enabled in step S703. If the continuous reading setting is determined to be enabled, the processing proceeds to step S706. If the continuous reading setting is determined to be disabled, the processing proceeds to step S705.

In step S705, the CPU 211 controls the scanner 221 to read the document and generate image data. In the case of reading the document set on the document positioning plate 300, the CPU 211 reads a single document. If the ADF 301 is used to continuously read documents, the CPU 211 reads an entire document stack set on the ADF 301. The processing then proceeds to step S707.

On the other hand, if, in steps S703 and S704, the read instruction is determined to be needed (DOCUMENT POSITIONING PLATE in step S703 or YES in step S704), the processing proceeds to step S706. In step S706, the CPU 211 accepts an instruction from the user whether to read the next document each time a document is read. The processing of step S706 will be described in detail with reference to the steps of FIG. 8.

Figure 9:
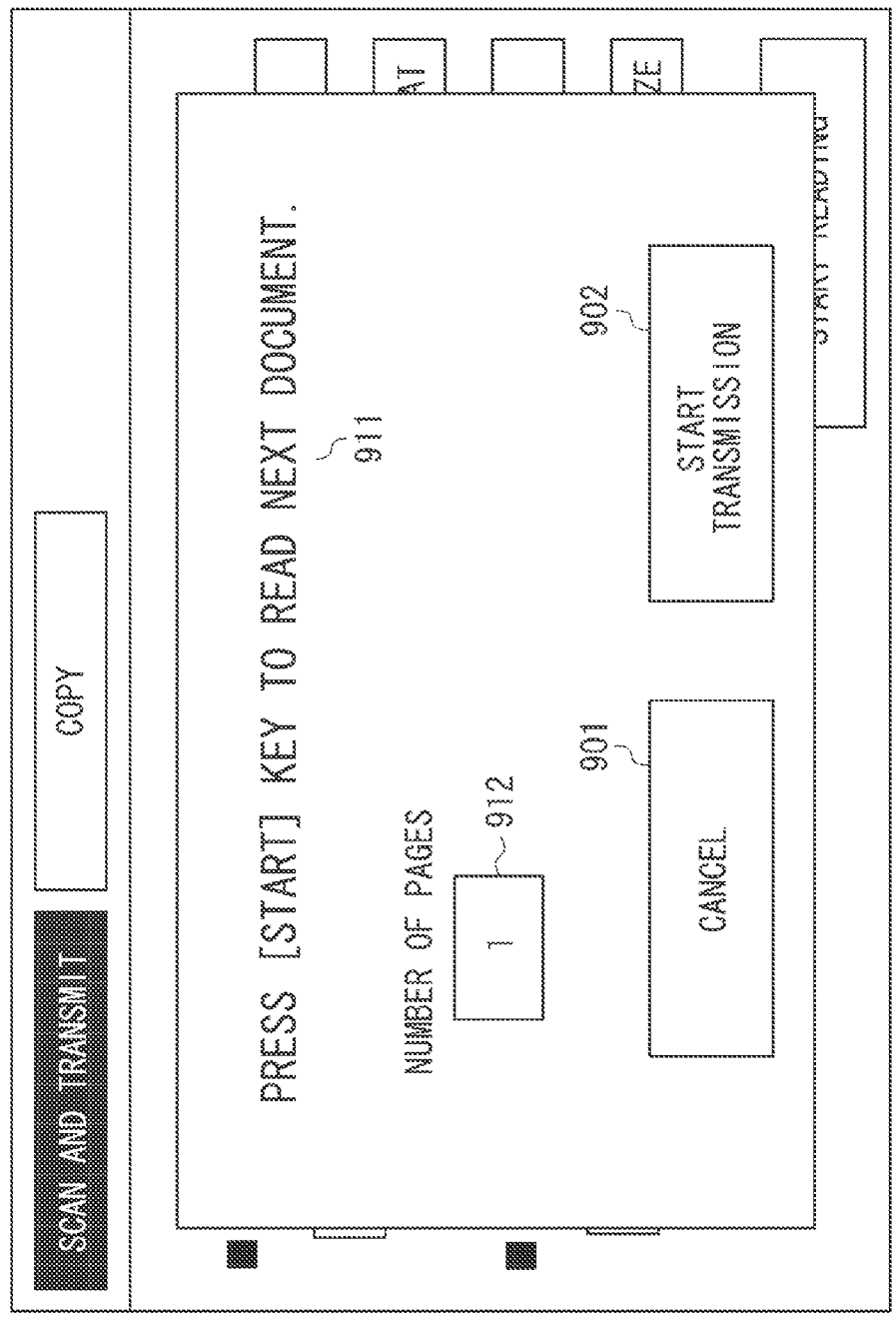
FIG. 9 is a diagram illustrating an operation screen of the MFP according to the exemplary embodiment.

In step S801, the CPU 211 initializes a timer for measuring time. In step S802, the CPU 211 reads a document or documents to generate image data in a manner similar to step S705. In step S803, the CPU 211 displays the continuation confirmation screen for inquiring whether to read the next document. FIG. 9 illustrates an example of the continuation confirmation screen presented to the user in step S803.

FIG. 9 illustrates an operation key 901 "cancel" and an operation key 902 "start transmission." Information 911 notifies the user that the start key provided as a hard key outside the screen can be pressed to start reading the next document. Information 912 notifies the user of the number of read documents.

Referring back to FIG. 8, after the continuation confirmation screen is displayed in step S803, the processing proceeds to step S804. In step S804, the CPU 211 activates the timer to start measuring time. In the present exemplary embodiment, the CPU 211 starts measuring time in step S804. However, this is not restrictive. For example, the CPU 211 may start measuring time before the continuation confirmation screen is displayed in step S803.

In step S805, the CPU 211 determines whether an instruction to read the next document has been given. If the CPU 211 has received a key event notifying of pressing of the start key, the CPU 211 determines that the instruction to read the next document has been given (YES in step S805). The processing then returns to step S801. In step S801, the CPU 211 starts reading the next document. If the CPU 211 has not received the key event notifying of the pressing of the start key (NO in step S805), the processing proceeds to step S806.

In step S806, the CPU 211 determines whether an instruction to start transmission has been given. If the CPU 211 has received a touch event notifying of pressing of the operation key 902, the CPU 211 determines that the instruction to start transmission has been given (YES in step S806). Then, the CPU 211 ends the continuous reading processing, and the processing proceeds to step S707 of FIG. 7. On the other hand, if the CPU 211 has not received the touch event notifying of the pressing of the operation key 902 (NO in step S806), the processing proceeds to step S807.

In step S807, the CPU 211 determines whether an instruction to cancel transmission has been given. If the CPU 211 has received a touch event notifying of pressing of the operation key 901 (YES in step S807), the processing proceeds to step S809 to cancel the transmission job under execution. In step S809, the CPU 211 stops reading the document, deletes the image data stored in the HDD 214, and cancels the execution of the transmission job. If the transmission job under execution is cancelled, the screen returns to the transmission job setting screen (FIG. 5), and the CPU 211 enters a state of waiting for a new transmission job.

On the other hand, if the CPU 211 has not received the touch event notifying of the pressing of the operation key 901 (NO in step S807), the processing proceeds to step S808.

In step S808, the CPU 211 determines whether a predetermined time (for example, one minute) has elapsed (timeout) since the timer started measuring time in step S804. If the predetermined time has not elapsed since the timer started measuring time (NO in step S808), the processing returns to step S805. If the predetermined time has elapsed since the timer started measuring time (YES in step S808), the CPU 211 ends the continuous reading processing. The processing then proceeds to step S707 of FIG. 7. The CPU 211 may initialize (reset) the timer and start measuring time each time a user operation is detected. In such a case, the CPU 211 is configured to reset the timer and start measuring time when any input is detected to be made to the operation unit 219 and when the document positioning plate cover 319 is detected to be opened or closed. A sensor (not-illustrated) for detecting the user may be used to detect whether the user is near the MFP 101. In such a case, the CPU 211 may start measuring time when the user is detected to have moved away from the MFP 101, and reset the timer and start measuring time when the user is detected to be near the MFP 101.

The predetermined time used for the determination in step S807 may be a fixed value determined by the MFP 101. The predetermined time may be set by an administrator of the MFP 101.

Referring back to FIG. 7, if the reading of the document(s) is completed in step S705 or S706, the processing proceeds to step S707.

In step S707, the CPU 211 determines whether the preview setting is enabled. If the preview setting is determined to be enabled (YES in step S707), the processing proceeds to step S708. If the preview setting is determined not to be enabled (disabled) (NO in step S707), the processing proceeds to step S709. In step S708, the CPU 211 displays a preview screen on the operation unit 219 and waits for the user's instruction. The processing of step S708 will be described in detail with reference to the steps of FIG. 10.

Figure 11:
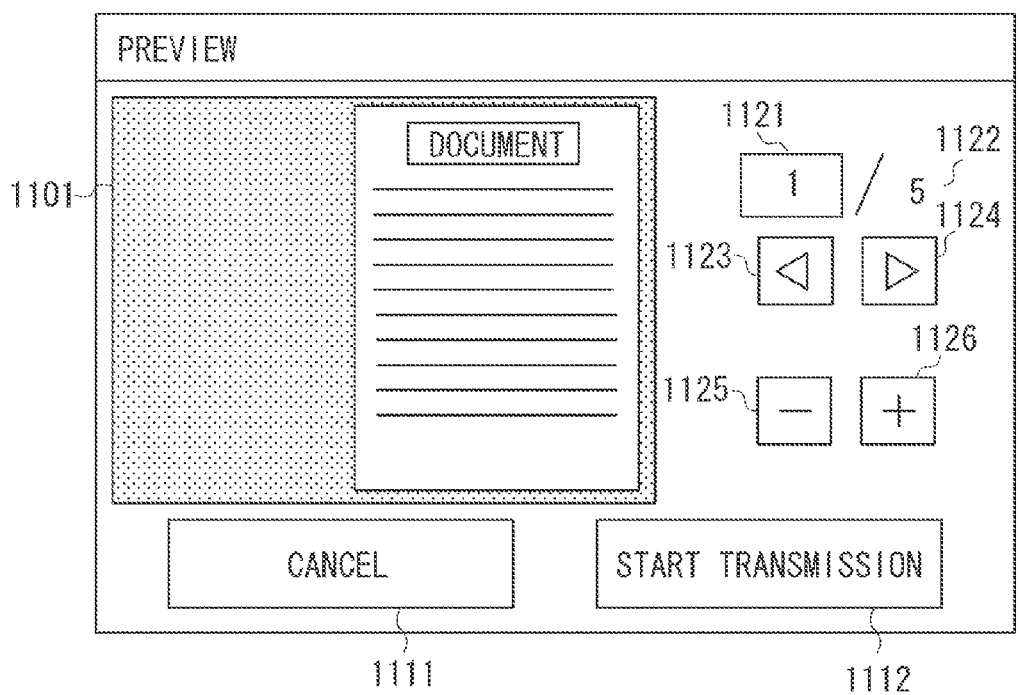
FIG. 11 is a diagram illustrating an operation screen of the MFP according to the exemplary embodiment.

In step S1001, the CPU 211 initializes the timer for measuring time. In step S1002, the CPU 211 displays the preview screen for checking the reading result of the image data. FIG. 11 illustrates an example of the preview screen presented to the user in step S1002.

FIG. 11 illustrates an operation key 1111 "cancel" and an operation key 1112 "start transmission." An area 1101 is a preview area for displaying an image of generated image data. More specifically, the CPU 211 generates a preview image for displaying the entire area of the image data in the preview area, and displays the preview image in the area 1101.

An area 1121 notifies the user what page number the image data displayed in the area 1101 is of. The area 1121 is used to change the image data to be displayed. If the user selects the area 1121, the CPU 211 accepts input of the page number of the image data to be displayed in the area 1101 via a numerical keypad (not illustrated). Accepting the input, the CPU 211 changes the image data to display in the area 1101.

Information 1122 notifies the user of the total number of pages of the read image data. An operation key 1123 is an operation key to be used to display in the area 1101 the image data of the previous page with respect to the page displayed in the area 1101. An operation key 1124 is an operation key to be used to display the image data of the next page in the area 1101.

An operation key 1125 is an operation key to be used to reduce and display the image data. An operation key 1126 is an operation key to be used to enlarge and display the image data. If the image data is displayed so large that the entire area cannot be fit into the preview area due to the user's operation through the key 1125, the screen can be scrolled. The screen can be scrolled by using scroll keys (not-illustrated) or by touch gestures input to the operation unit 219.

Referring back to FIG. 10, after the preview screen is displayed in step S1002, the processing proceeds to step S1003. In step S1003, the CPU 211 activates the timer to start measuring time. In step S1004, the CPU 211 determines whether an instruction to start transmission has been given. If the CPU 211 has received a touch event notifying of pressing of the operation key 1112, the CPU 211 determines that the instruction to start transmission has been given (YES in step S1004). Then, the CPU 211 ends the preview processing, and the processing proceeds to step S709 of FIG. 7.

On the other hand, if the CPU 211 has not received the touch event notifying of the pressing of the operation key 1112 (NO in step S1004), the processing proceeds to step S1005. In step S1005, the CPU 211 determines whether an instruction to cancel transmission has been given. If the CPU 211 has received a touch event notifying of pressing of the operation key 1111 (YES in step S1005), the processing proceeds to step S1007. In step S1007, the CPU 211 performs cancellation processing and then cancels the transmission job under execution. If the transmission job under execution is cancelled, the screen returns to the transmission job setting screen illustrated in FIG. 5 and the CPU 211 enters the state of waiting for a new transmission job. On the other hand, if the CPU 211 has not received the touch event notifying of the pressing of the operation key 1111 (NO in step S1005), the processing proceeds to step S1006.

In step S1006, the CPU 211 determines whether the time measured by the timer has passed a predetermined time since the timer started measuring time. If the predetermined time has not elapsed since the timer started measuring time (NO in step S1006), the processing returns to step S1004 to wait for the user's instruction. If the predetermined time has elapsed since the timer started measuring time (YES in step S1006), the processing proceeds to step S1007. In step S1007, the CPU 211 performs the cancellation processing and then cancels the execution of the transmission job.

Referring back to FIG. 7, if the preview processing of step S708 ends or if, in step S707, the preview setting is determined not to be enabled (NO in step S707), the processing proceeds to step S709.

In step S709, the CPU 211 determines whether the destination confirmation setting is enabled. If the destination confirmation setting is determined to be enabled (YES in step S709), the processing proceeds to step S710. If the destination confirmation setting is determined to not be enabled (NO in step S710), the processing proceeds to step S711. In step S711, the CPU 211 transmits the image data and then ends the transmission control.

In step S710, the CPU 211 displays a destination confirmation screen on the operation unit 219 and waits for the user's instruction. The processing of step S710 will be described in detail with reference to the steps of FIG. 12.

In step S1201, the CPU 211 initializes the timer for measuring time. In step S1202, the CPU 211 displays the destination confirmation screen for confirming the destination(s) to which the image data is transmitted. FIG. 13 illustrates an example of the destination confirmation screen presented to the user in step S1202. The destination confirmation screen lists a destination or destinations that is/are set when the CPU 211 accepts the instruction to execute the transmission job by the pressing of the operation key 531 or by the pressing of the start key provided as a hard key outside the screen.

FIG. 13 illustrates an operation key 1301 "cancel" and an operation key 1302 "start transmission." Information 1311 notifies the user that this screen is one for confirming the destinations before transmission and of the number of set destinations. Information 1312 lists the set destinations for notification.

Referring back to FIG. 12, after the destination confirmation screen is displayed in step S1202, the processing proceeds to step S1203. The destination confirmation processing of steps S1203 to S1207 includes the determination of an instruction to start transmission, the determination of an instruction to cancel transmission, and the determination of a timeout similar to those of the processing of steps S1003 to S1007. A detailed description thereof will thus be omitted. The CPU 211 performs the determination of the instruction to start transmission based on a touch event notifying of pressing of the operation key 1302. The CPU 211 performs the determination of the instruction to cancel transmission based on a touch event notifying of pressing of the operation key 1301. The predetermined time used for the determination of the timeout is set at the same value as in the continuous reading processing and the preview processing. However, different times may be set.

The preview processing (step S708) and the destination confirmation processing (step S710) are examples of the function for confirmation by the user. For example, the MFP 101 may provide only the preview function or only the destination confirmation function as the function. The MFP 101 may be configured to perform the destination confirmation processing before the preview processing. The MFP 101 may be configured to be capable of setting an additional function or functions for confirming with the user.

As has been described above, when the MFP 101 performs the continuous reading processing, an inquiry to the user may be left unanswered. According to the present exemplary embodiment, the MFP 101 does not perform automatic transmission if the function for confirmation by the user is set for the transmission job (YES in step S707 or S709). This can prevent the transmission job for which the function for confirmation by the user is set from being transmitted without confirmation by the user. Moreover, since the function for confirmation by the user has a timeout, the transmission job can be prevented from being left when other users use the image processing apparatus.

Next, a second exemplary embodiment will be described. The first exemplary embodiment has dealt with the case where if a timeout occurs during the continuous reading processing (step S706) and the function for confirmation by the user is set, the MFP 101 performs the confirmation processing using the function. However, the occurrence of a timeout in the middle of the continuous reading processing indicates that the user is highly likely not to be near the MFP 101. In such a case, the preview display and the destination confirmation display may be not only useless but can even result in information leakage.

The second exemplary embodiment deals with an example where if the function for confirmation by the user is set and a timeout occurs during the continuous reading processing (S706), the MFP 101 cancels the transmission job. Similar components to those of the first exemplary embodiment will be designated by the same reference numerals. A detailed description thereof will be omitted.

Figure 14:
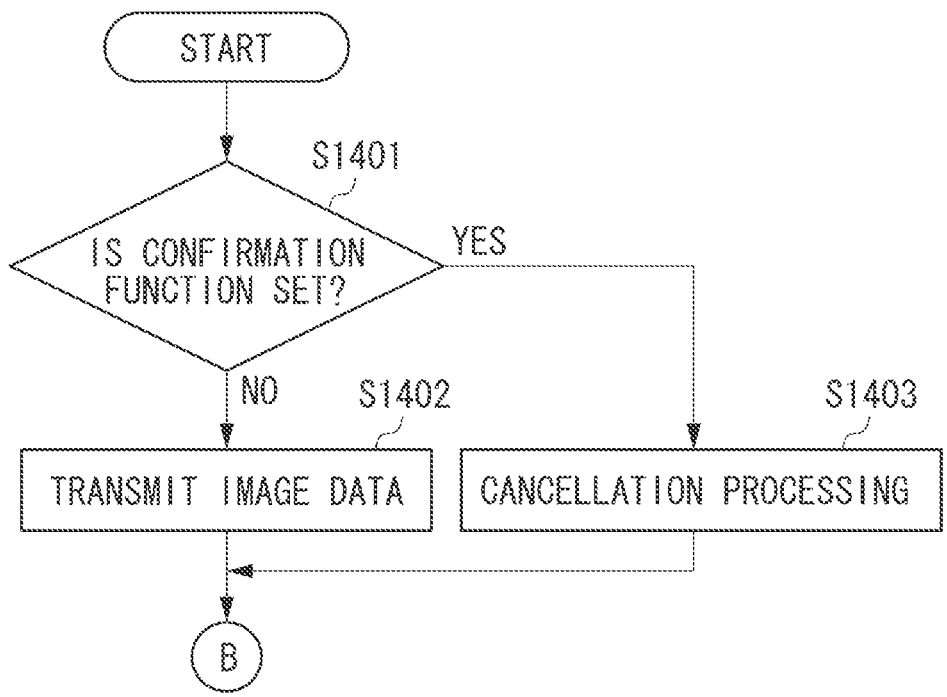
FIG. 14 is a flowchart illustrating transmission processing of an MFP according to an exemplary embodiment.

FIG. 14 is a flowchart illustrating a control when a predetermined time has elapsed without the user's instruction being accepted during the continuous reading processing of the MFP 101. Operations (steps) illustrated in the flowchart of FIG. 14 are implemented by the CPU 211 of the MFP 101 executing a control program stored in the HDD 214.

In the present exemplary embodiment, if, in step S808 of the continuous reading processing (FIG. 8) according to the first exemplary embodiment, the predetermined time is determined to have elapsed since the timer started measuring time (YES in step S808), the processing proceeds to step S1401.

In step S1401, the CPU 211 determines whether the function for confirmation by the user (preview function and/or destination confirmation function) is set according to setting information about the transmission job.

In step S1401, if the confirmation function is determined to be set (YES in step S1401), the processing proceeds to step S1403. In step S1403, the CPU 211 cancels the transmission job and ends the transmission control. On the other hand, in step S1401, if the confirmation function is determined not to be set (NO in step S1401), the processing proceeds to step S1402. In step S1402, the CPU 211 transmits the image data and ends the transmission control.

In the present exemplary embodiment, the CPU 211 makes the determination based on the setting information about the transmission job if a timeout occurs when performing the continuous reading processing according to the first exemplary embodiment. However, this is not restrictive. For example, the CPU 211 may perform the determination of step S1401 when starting executing the transmission job (step S702) or each time the confirmation function is set to be enabled. In such a case, in step S1401, the CPU 211 may obtain the result of the determination made in advance. If the obtained determination result indicates that the confirmation function is set to be enabled (YES in step S1401), the processing proceeds to step S1403. On the other hand, if the obtained determination result indicates that the confirmation function is not set to be enabled (NO in step S1401), the processing proceeds to step S1402.

As has been described above, according to the present exemplary embodiment, the MFP 101 can perform automatic transmission if a timeout occurs during the continuous reading processing and the function for confirmation by the user is not set for the transmission job. On the other hand, if the function for confirmation by the user is set for the transmission job, the MFP 101 can cancel the transmission job without displaying a confirmation screen.

The foregoing first and second exemplary embodiments have dealt with the transmission control of the "scan and transmit" function. However, the exemplary embodiments are also applicable to other functions that perform the continuous reading processing when reading documents. Specifically, the exemplary embodiments can be applied to the "copy" function for printing a scanned document(s), illustrated in FIG. 3. The exemplary embodiments can be further applied to a "scan and store" function for storing a scanned document(s) into a storage area readable and writable by the MFP 101.

In the foregoing first and second exemplary embodiments, the MFP 101 is described to be an example of the apparatus to which the exemplary embodiments can be applied. However, the apparatus to which the exemplary embodiments can be applied is not limited to the MFP. More specifically, the exemplary embodiments can be applied to image processing apparatuses that can at least obtain image data, aside from the MFP. Examples may include devices such as a scanner, a digital camera, a smartphone, and a tablet terminal.

For example, if the exemplary embodiments are applied to a digital camera, the scanner 221 corresponds to a two-dimensional imaging unit. The control program corresponds to an application that executes a job for imaging a plurality of images. The operation unit 219 corresponds to a user interface (UI) of the digital camera.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments of the present disclosure, if, for example, the image processing apparatus inquires of the user whether to read the next document, a predetermined time has elapsed without the user's instruction being accepted, and the confirmation function is set, then the image processing apparatus can quit starting processing for transmitting image data. Such a mechanism enables control for preventing the execution of transmission or other processing unintended by the user.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-082018 filed Apr. 11, 2014, which is hereby incorporated by reference herein in its entirety.

What is claimed is:

1. An image processing apparatus comprising:
    a reading unit configured to read a document to generate image data;
    an outputting unit configured to perform, based on receiving an instruction for performing output processing of the image data, output processing for outputting the image data;
    an acceptance unit configured to accept, after the reading unit reads the document, a read instruction to read a next document;
    a control unit configured to, in a case where a predetermined time has elapsed without the read instruction being accepted and the instruction being received, and a function for displaying the image data after receiving the instruction is not set, perform output of the image data,
    wherein the control unit, in a case where the predetermined time has elapsed without the read instruction being accepted and the instruction being received, and the function is set, does not perform output processing of the image data.

2. The image processing apparatus according to claim 1 wherein the control unit is configured to, in a case where the predetermined time has elapsed without the reading instruction being accepted and the instruction being received, and the function is set, cancel a job for performing the output processing.

3. The image processing apparatus according to claim 1, wherein the control unit is configured to, in a case where the read instruction is accepted by the acceptance unit before the predetermined time has elapsed, start reading of the next document.

4. The image processing apparatus according to claim 1, wherein the output processing is processing corresponding to at least one of processing for transmitting the image data to an external apparatus, and processing for printing the image data onto a sheet.

5. The image processing apparatus according to claim 1, further comprising:
    a first reading unit configured to read a document set on a document positioning plate to generate image data;
    a second reading unit configured to read at least one document set on a document feeding unit to generate image data; and
    a setting unit configured to set whether to enable acceptance of an instruction by the acceptance unit,
    wherein the control unit is configured to, in a case where the first reading unit reads the document, control performance to accept the read instruction regardless of content of setting by the setting unit.

6. The image processing apparatus according to claim 5, wherein the control unit is configured to, in a case where the second reading unit reads the document, control performance to accept the read instruction based on the content of the setting by the setting unit.

7. A method for controlling an image processing apparatus, the method comprising:
    reading a document to generate image data;
    performing output processing for outputting the image data based on receiving an instruction for performing output processing of image data;
    accepting, after reading a document, a read instruction to read a next document; and
    performing, in a case where a predetermined time has elapsed without the read instruction being accepted and the instruction being received, and a function for displaying the image data after receiving the instruction is not set, output processing of the image data,
    wherein the output processing of the image data is not performed in a case where the predetermined time has elapsed without the read instruction being accepted and the instruction being received, and the function is set.

8. A non-transitory computer readable storage medium storing computer executable instructions for performing a method for controlling an image processing apparatus, the method comprising:
    reading a document to generate image data;
    performing output processing for outputting the image data based on receiving an instruction for performing output processing of image data;
    accepting, after reading a document, a read instruction to read a next document; and
    performing, in a case where a predetermined time has elapsed without the read instruction being accepted and the instruction being received, and a function for displaying the image data after receiving the instruction is not set, output processing on the image data,
    wherein the output processing of the image data is not performed in a case where the predetermined time has elapsed without the read instruction being accepted and the instruction being received, and the function is set.

9. An image processing apparatus, comprising:
a reading unit configured to read a document to generate image data;
an outputting unit configured to perform, based on receiving an instruction for performing output processing of the image data, output processing for outputting the image data;
an acceptance unit configured to accept, after the reading unit reads the document, a read instruction to read a next document;
a control unit configured to, in a case where a predetermined time has elapsed without the read instruction being accepted and the instruction being received, and a function for displaying an output destination of the image data after receiving the instruction is not set, perform output processing of the image data,
wherein the control unit, in a case where the predetermined time has elapsed without the read instruction being accepted and the instruction being received, and the function is set, does not perform output processing of the image data.

* * * * *